US010613359B2

(12) United States Patent
Zuo et al.

(10) Patent No.: US 10,613,359 B2
(45) Date of Patent: Apr. 7, 2020

(54) TABLE FOR OPTICAL ALIGNMENT DEVICE, OPTICAL ALIGNMENT DEVICE, AND OPTICAL ALIGNMENT METHOD FOR A SUBSTRATE (71) Applicants: BOE Technology Group Co., Ltd., Beijing (CN); Beijing BOE Display Technology Co., Ltd., Beijing (CN)

(72) Inventors: Hongye Zuo, Beijing (CN); Xu Wang, Beijing (CN); Aizhen Jia, Beijing (CN)

(73) Assignees: BOE Technology Group Co., Ltd., Beijing (CN); Beijing BOE Display Technology Co., Ltd., Beijing (CN)

(*) Notice: Subject to any disclaimer, the term of this patent is extended or adjusted under 35 U.S.C. 154(b) by 266 days.

(21) Appl. No.: 15/718,894

(22) Filed: Sep. 28, 2017

(65) Prior Publication Data
US 2018/0246352 A1    Aug. 30, 2018

(30) Foreign Application Priority Data
Feb. 27, 2017   (CN) .......................... 2017 1 0108372

(51) Int. Cl.
G02F 1/13      (2006.01)
G02F 1/1337    (2006.01)
(Continued)

(52) U.S. Cl.
CPC ........... G02F 1/1303 (2013.01); B23Q 3/186 (2013.01); B23Q 16/02 (2013.01); G02F 1/133788 (2013.01)

(58) Field of Classification Search
CPC ............. G02F 1/1303; G02F 1/133753; G02F 1/133788; G02F 1/133512; G02F 1/133509; G02F 2001/133757; G02F 2001/133761; B23Q 3/18; B23Q 3/186; B23Q 16/02; B23Q 16/06
See application file for complete search history.

(56) References Cited

U.S. PATENT DOCUMENTS 5,625,475 A  *  4/1997  Tanioka ............ G02F 1/133711
                                                349/123
5,628,660 A  *  5/1997  Onitsuka ............. G02F 1/13454
                                                 445/24
(Continued)

FOREIGN PATENT DOCUMENTS

WO     WO-2013180326 A1 * 12/2013  ........... G02F 1/1303

Primary Examiner — Tyrone V Hall, Jr.
(74) Attorney, Agent, or Firm — Arent Fox LLP; Michael Fainberg (57) ABSTRACT The present disclosure discloses a table for an optical alignment device, an optical alignment device, and an optical alignment method for a substrate. The table for an optical alignment device includes: a base including a rotation shaft; a support component connected with the rotation shaft; an installation component connected with the rotation shaft; a plurality of sliding guiding mechanisms connected with the installation component; and a plurality of groups of light shielding mechanisms; wherein each sliding guiding mechanism is slidably installed with a group of light shielding mechanisms, each light shielding mechanism in each group of light shielding mechanisms includes a light shielding plate which can slide to above a selected area of the support component.

13 Claims, 5 Drawing Sheets (51) Int. Cl.
*B23Q 3/18* (2006.01)
*B23Q 16/02* (2006.01)

(56) References Cited

U.S. PATENT DOCUMENTS

| | | | | |
|---|---|---|---|---|
| 8,395,736 | B2 * | 3/2013 | Shin | G02F 1/133753 |
| | | | | 349/124 |
| 9,366,908 | B2 * | 6/2016 | Xiong | G02F 1/133753 |
| 2009/0101064 | A1 * | 4/2009 | Naka | B41J 3/28 |
| | | | | 118/313 |
| 2009/0304916 | A1 * | 12/2009 | Nakajima | B41J 3/28 |
| | | | | 427/140 |
| 2010/0288101 | A1 * | 11/2010 | Iwamoto | C03B 33/0207 |
| | | | | 83/883 |
| 2012/0067500 | A1 * | 3/2012 | Nishioka | G02F 1/1303 |
| | | | | 156/60 |
| 2013/0176521 | A1 * | 7/2013 | Jung | G02F 1/133788 |
| | | | | 349/128 |
| 2013/0341158 | A1 * | 12/2013 | Yang | B65G 47/244 |
| | | | | 198/409 |

\* cited by examiner

TABLE FOR OPTICAL ALIGNMENT DEVICE, OPTICAL ALIGNMENT DEVICE, AND OPTICAL ALIGNMENT METHOD FOR A SUBSTRATE

CROSS-REFERENCE TO RELATED APPLICATION

This Application claims priority to Chinese Patent Application No. 201710108372.X, filed on Feb. 27, 2017, the content of which is incorporated by reference in the entirety.

TECHNICAL FIELD

The present disclosure relates to the field of manufacturing a display device, and particularly to a table for an optical alignment device, an optical alignment device, and an optical alignment method for a substrate.

DESCRIPTION OF THE RELATED ART

A liquid crystal panel of a Thin Film Transistor-Liquid Crystal Display (TFT-LCD) includes an array substrate and a color filter substrate box-aligned using frame sealant, and liquid crystals located between the array substrate and the color filter substrate. Anisotropic alignment films arranged on the sides of the array substrate and the color filter substrate proximate to the liquid crystals can have the liquid crystals aligned so that liquid crystal molecules are arranged regularly in a fixed direction. When manufacturing the TFT-LCD, the liquid crystal panel of the TFT-LCD, as a cutting unit, is cut from an entire liquid crystal panel, and the alignment of the array substrate and the color filter substrate (simply referred below to as a substrate) is also processed on an entire panel.

At present the substrate is aligned generally as a result of physically frictional alignment and optical alignment, where optical alignment has the advantages of no electrostatic charges, no pollution, and high efficiency over frictional alignment. Under the principle of optical alignment, the substrate coated with sensitive alignment liquid is irradiated with polarized ultraviolet light to make the surface of the sensitive alignment liquid anisotropic to thereby form an alignment film.

In the related art, the substrate is typically aligned using an optical alignment device. The optical alignment device includes a table for supporting the substrate, and an ultraviolet lamp located above the table, and the substrate is aligned by placing the substrate on the table with the side thereof coated with the sensitive alignment liquid facing up, and starting the ultraviolet lamp to irradiate the substrate to thereby form an alignment film on the substrate.

As the industry of liquid crystal displays are developing rapidly, liquid crystal display products become increasingly competitive to each other, and the utilization ratio of a glass substrate which is a base substrate is one of key factors to determine a production cost. In the Multi-Model Group technology, different models of products are designed to be arranged on the same glass substrate to thereby make full use of a blank area remaining after only the same model of products are arranged, so as to significantly alleviate a raw material from being wasted. However the substrate can only be aligned in a single direction using the existing optical alignment device, which contradicts the MMG technology in that, different models of products cannot be designed to be arranged on the glass substrate, thus wasting a significant area, and resulting in a high production cost.

SUMMARY

Embodiments of the present disclosure provide a table for an optical alignment device, an optical alignment device, and an optical alignment method for a substrate.

In one aspect, an embodiment of the present disclosure provides a table for an optical alignment device, the table includes: a base including a rotation shaft; a support component connected with the rotation shaft; an installation component connected with the rotation shaft; a plurality of sliding guiding mechanisms connected with the installation component; and a plurality of groups of light shielding mechanisms; wherein each sliding guiding mechanism is slidably installed with a group of light shielding mechanisms, each light shielding mechanism in each group of light shielding mechanisms includes a light shielding plate which can slide to above a selected area of the support component.

In another aspect, an embodiment of the present disclosure further provides an optical alignment device, the device includes a table for an optical alignment device, wherein the table includes: a base including a rotation shaft; a support component connected with the rotation shaft; an installation component connected with the rotation shaft; a plurality of sliding guiding mechanisms connected with the installation component; and a plurality of groups of light shielding mechanisms; wherein each sliding guiding mechanism is slidably installed with a group of light shielding mechanisms, each light shielding mechanism in each group of light shielding mechanisms includes a light shielding plate which can slide to above a selected area of the support component.

In still another aspect, an embodiment of the present disclosure further provides an optical alignment method for a substrate, applicable to the optical alignment device above, wherein the substrate is placed on the support component of the optical alignment device, and there are at least two different models of products designed to be arranged on the substrate with their alignment directions different from each other; and the method includes: driving light shielding plates of several light shielding mechanisms to slide to above products with other models than products with a model to be aligned on the substrate; aligning the products with the model to be aligned on the substrate; and driving the rotation shaft to rotate by a selected angle, so as to align products with another model to be aligned on the substrate.

BRIEF DESCRIPTION OF THE DRAWINGS

In order to make the technical solutions according to the embodiments of the present disclosure more apparent, the drawings to which a description of the embodiments refers will be briefly introduced below, and apparently the drawings to be described below are merely illustrative of some of the embodiments of the present disclosure, and those ordinarily skilled in the art can derive from these drawings other drawings without any inventive effort.

DETAILED DESCRIPTION OF THE EMBODIMENTS

In order to improve the utilization ratio of a base substrate, and to lower a production cost, embodiments of the present disclosure provide a table for an optical alignment device, an optical alignment device, and an optical alignment method for a substrate. In order to make the objects, technical solutions, and advantages of the embodiments of the present disclosure more apparent, the technical solutions according to the embodiments of the present disclosure will be described below clearly and fully with reference to the drawings in the embodiments of the present disclosure, and apparently the embodiments described below are only a part but not all of the embodiments of the present disclosure. Based upon the embodiments here of the present disclosure, all the other embodiments which can occur to those skilled in the art without any inventive effort shall fall into the scope of the present disclosure.

It shall be appreciated that the following descriptions of some embodiments presented herein are merely intended to illustrate and describe, but not to limit the present disclosure.

Figure 1:
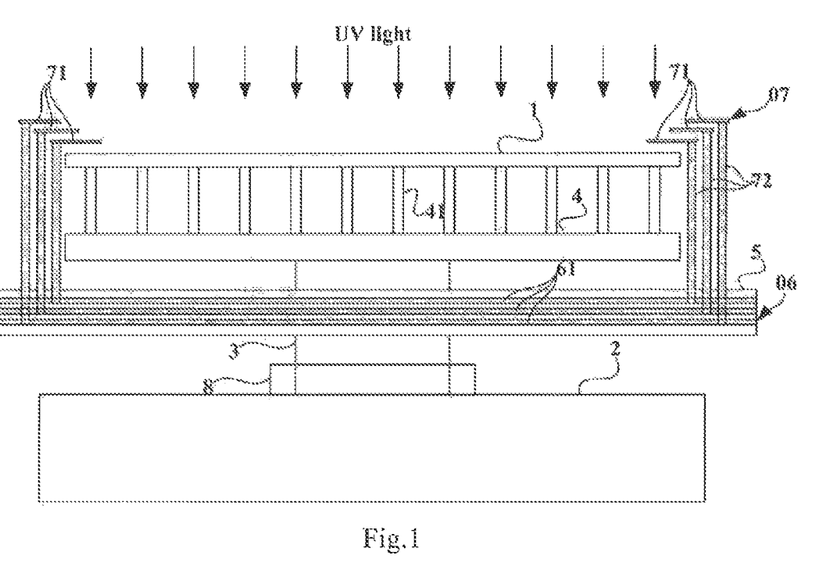
FIG. 1 is a front view of a table for an optical alignment device according to an embodiment of the present disclosure.
Figure 2:
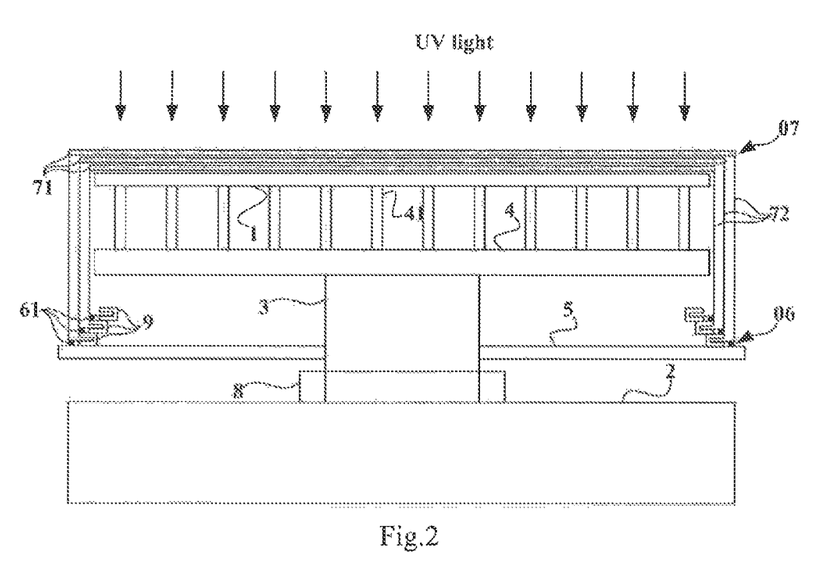
FIG. 2 is a side view of a table for an optical alignment device according to an embodiment of the present disclosure.

As illustrated in FIG. 1 and FIG. 2, a table for an optical alignment device according to an embodiment of the present disclosure includes: a base 2 including a rotation shaft 3; a support component 4 connected with the rotation shaft 3; an installation component 5 connected with the rotation shaft 3; a plurality of sliding guiding mechanisms 06 connected with the installation component 5; and a plurality of groups of light shielding mechanisms 07; wherein each sliding guiding mechanism 06 is slidably installed with a group of light shielding mechanisms 07, each light shielding mechanisms 07 in each group of light shielding mechanisms 07 includes a light shielding plate 71 which can slide to above a selected area of the support component 4. That is, all the components in the table are installed according to the above connection mode with one another.

The optical alignment device including the table according to the embodiment of the present disclosure can align the substrate in different directions, and since different models of products can be designed to be arranged on the substrate, the utilization ratio of the base substrate can be improved, and the production cost can be lowered, as compared with the related art. For example, products with a model A and products with a model B are designed to be arranged on the substrate with their alignment directions perpendicular to each other, and in order to align the products with a model A, several light shielding mechanisms are selected, and slide over a selected distance respectively over the sliding guiding mechanisms so that the light shielding plates of these light shielding mechanisms shield above the products with a model B on the substrate, and in this case, the products with a model A can be aligned without irradiating the products with a model B. Thereafter the rotation shaft is rotated by 90 degrees, as a result, the support component, the respective sliding guiding mechanisms, and the light shielding mechanisms are also rotated by 90 degrees therewith; and several light shielding mechanisms are selected, and slide over a selected distance respectively over the sliding guiding mechanisms so that the light shielding plates of these light shielding mechanisms shield above the products with a model A on the substrate, and in this case, the products with a model B can be aligned without irradiating the products with a model A.

In some embodiments, there are a plurality of support nails 41 arranged uniformly on an upper surface of the support component 4, wherein the upper surface of the support component 4 is a surface facing away from a surface of the support component 4 facing the base 2; and under the condition that the substrate 1 is placed on the support component 4, the support nails 41 will support a lower surface of the substrate 1, wherein the lower surface of the substrate 1 is a surface facing the support component 4. The installation component 5 acts to connect the rotation shaft 3 with the sliding guiding mechanisms 06, and while the rotation shaft 3 is rotating, the installation component 5 and the sliding guiding mechanisms 06 will rotate with the rotation shaft 3, where the installation component 5 will not be limited to any particular shape. The sliding guiding mechanisms 06 guide the light shielding mechanisms 07 to slide and each can include only one guiding rail, or can include two or more than two guiding rails. When a light shielding mechanism 07 sliding over a sliding guiding mechanism 06, the light shielding plate 71 of the light shielding mechanism 07 can slide to above a selected area of the support component 4.

The sliding guiding mechanisms 06 and the light shielding mechanisms 07 will not be limited to any particular structural forms. In some embodiments, each sliding guiding mechanism 06 includes two guiding rails 61 arranged opposite to each other on two sides of the support component 4; and each light shielding mechanism 07 includes two connection pieces 72 connected with the light shielding plate 71 of the light shielding mechanism 07, and slidably installed respectively over two guiding rails 61 of a sliding guiding mechanism 06 slidably installed with the light shielding mechanism 07. This structure can be designed simply and compactly to enable the light shielding mechanisms 07 to slide smoothly relative to the sliding guiding mechanisms 06.

In some embodiments of the present disclosure, guiding directions of different sliding guiding mechanisms 06 may or may not be the same. In some embodiments, the guiding directions of the sliding guiding mechanisms 06 are the same, i.e. the guiding direction of each sliding guiding mechanism 06 is consistent, and with this design, the table can be made structurally compact. In some embodiments, there are different distances between different sliding guiding mechanisms 06 and the support component 4 so that they are spaced in height from each other to thereby make the structure of the table designed more compact.

As illustrated in FIG. 1 and FIG. 2, in an embodiment of the present disclosure, there are different distances between the light shielding plates 71 of the light shielding mechanisms 07 slidably installed on different sliding guiding mechanisms 06 and the support component 4 so that the light shielding mechanisms 07 slidably installed on the different sliding guiding mechanisms 06 can slide freely without any interference thereto to thereby make it convenient to adjust the light shielding mechanisms 07 in position.

In some embodiments of the present disclosure, the light shielding plates 71 will not be limited to any particular size thereof parallel to the sliding direction, but the size thereof parallel to the sliding direction may be designed flexibly according to the specified size of products arranged on the substrate 1. As illustrated in FIG. 1, in some embodiments, there are at least two light shielding mechanisms 07 included in the group of light shielding mechanisms 07 slidably installed on each sliding guiding mechanism 06, and these light shielding mechanisms 07 are driven to slide along the sliding guiding mechanism 06 concurrently, thus improving the operational efficiency.

In some embodiments, the light shielding plates 71 will not be limited to any particular material thereof. In some embodiments, they may be aluminum alloy light shielding plates, or metal light shielding plates plated with a thin oxide film, with a good shielding effect.

Figure 3:
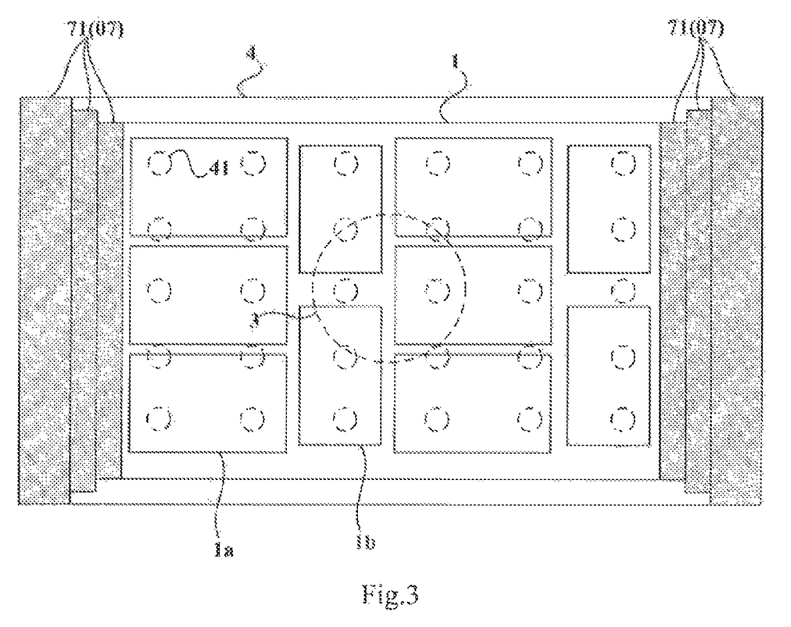
FIG. 3 is a top view of a table for an optical alignment device according to an embodiment of the present disclosure.

As illustrated in FIG. 3, taking as an example products 1a with a model A, and products 1b with a model B, which are designed to be arranged on a substrate 1, the specified size of the products 1a with a model A is larger than the specified size of the products 1b with a model B, and in order to improve the utilization ratio of the base substrate, the products 1a with a model A, and the products 1b with a model B are arranged on the substrate 1 as illustrated, where the products 1a with a model A need to be aligned in the direction parallel to the longer side of the substrate 1, and the products 1b with a model B need to be aligned in the direction parallel to the shorter side of the substrate 1.

Figure 4:
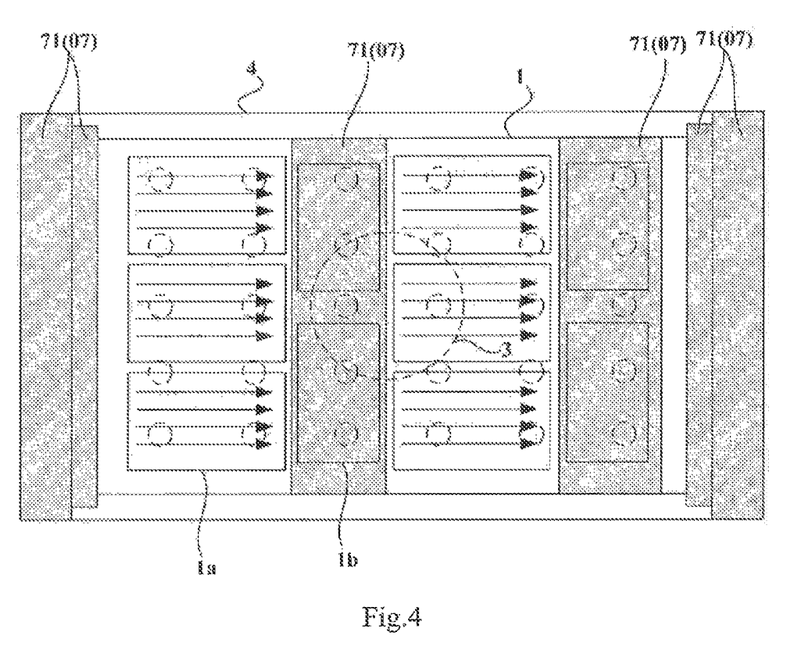
FIG. 4 is a top view of a table for an optical alignment device according to an embodiment of the present disclosure in an operating state.

As illustrated in FIG. 4, in order to align the products 1a with a model A, several light shielding mechanisms 07 are selected, and slide over a selected distance respectively over the sliding guiding mechanisms 06 so that the light shielding plates 71 of these light shielding mechanisms 07 shield above the products 1b with a model B on the substrate 1, the products 1a with a model A can be aligned without irradiating the products 1b with a model B.

Figure 5:
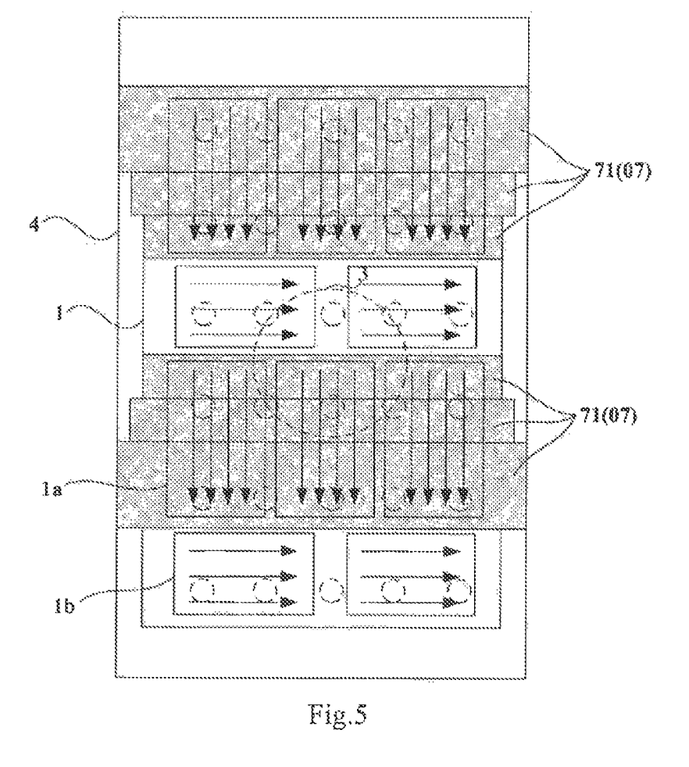
FIG. 5 is a top view of a table for an optical alignment device according to an embodiment of the present disclosure in another operating state.
Figure 6:
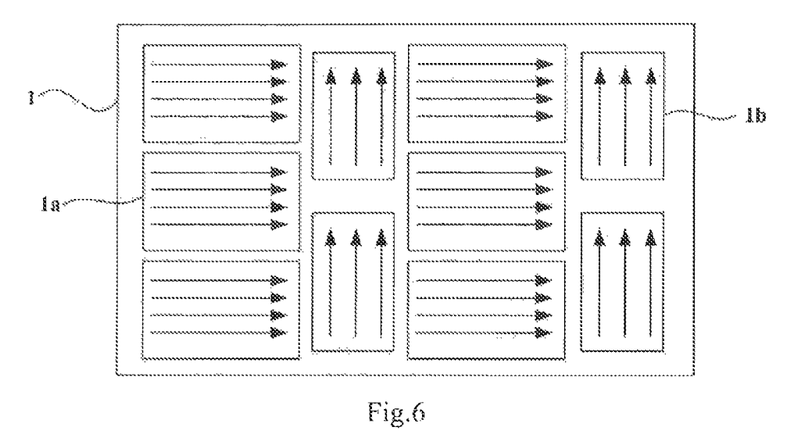
FIG. 6 is a schematic diagram of a substrate aligned by an optical alignment device according to an embodiment of the present disclosure.

After the products 1a with a model A are aligned, the light shielding plates 71 shielding above the products 1b with a model B on the substrate 1 are reset, and then rotated by 90 degrees around the rotation shaft 3, the support component 4, the respective sliding guiding mechanisms 06, and the light shielding mechanisms 07 are also rotated by 90 degrees therewith; and as illustrated in FIG. 5, several light shielding mechanisms 07 are selected, and slide over a selected distance respectively over the sliding guiding mechanisms 06 so that the light shielding plates 71 of these light shielding mechanisms 07 shield above the products 1a with a model A on the substrate 1, the products 1b with a model B can be aligned without irradiating the products 1a with a model A. FIG. 6 illustrates the substrate 1 after the products are aligned.

The substrate 1 on which two models of products are designed to be arranged with their alignment directions perpendicular to each other has been described in the embodiment above of the present disclosure by way of an example, the application of the embodiment of the present disclosure will not be limited thereto, and the table above will be also applicable to a substrate on which three or more models of products are designed to be arranged with their alignment directions different from each other as long as the products are aligned by driving the rotation shaft to rotate by a corresponding angle, and selecting an appropriate combination of light shielding mechanisms to shield a selected area of the substrate.

As can be apparent, the optical alignment device including the table according to the embodiment of the present disclosure can align the products on the substrate 1 in different directions, and since different models of products can be designed to be arranged on the substrate 1, the utilization ratio of the base substrate can be improved, and the production cost can be lowered, as compared with the related art.

Still referring to FIG. 1 and FIG. 2, in some embodiments, the table for an optical alignment device further includes: a rotation motor 8 for driving the rotation shaft 3 to rotate and linear motors 9 arranged respectively corresponding to the respective connection pieces 72 to drive the connection pieces 72 to slide over the guiding rails 61. According to the scheme, the rotation shaft 3 is driven by the rotation motor 8 to rotate, and the light shielding mechanisms 07 are driven by the linear motors 9 to slide over the sliding guiding mechanisms 06, so that the rotation angle and the sliding distance can be controlled more precisely.

In some embodiments, the table for an optical alignment device can further include a control device (not illustrated) electrically connected with the rotation motor 8 and the respective linear motors 9 for controlling operating states of the rotation motor 8 and the respective linear motors 9 according to a program. Wherein the control device can include a Programmable Logic Controller (PLC) to execute the program, which can be realized by a Central Processing Unit (CPU), a Micro Controller Unit (MCU), a Digital Signal Processor (DSP), a Field-Programmable Gate Array (FPGA) and so on. According to the scheme, the alignment direction of and the shielded area on the substrate can be adjusted automatically according to the program to thereby improve the automatic alignment of the products.

An embodiment of the present disclosure further provides an optical alignment device including the table for an optical alignment device according to any one of the embodiments above. The optical alignment device can align the products on the substrate in different directions, and since different models of products can be designed to be arranged on the substrate, the utilization ratio of the base substrate can be improved, and the production cost can be lowered, as compared with the related art.

Figure 7:
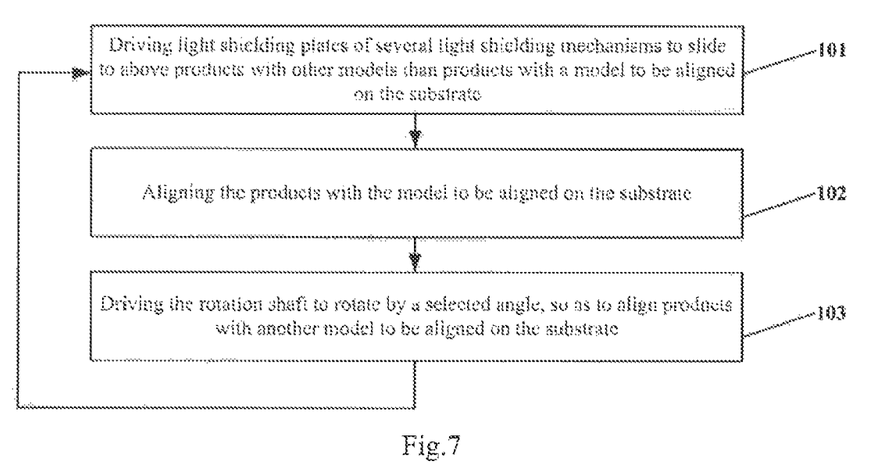
FIG. 7 is a schematic flow chart of an optical alignment method for a substrate according to an embodiment of the present disclosure.

As illustrated in FIG. 7, an embodiment of the present disclosure further provides an optical alignment method for a substrate, which is applicable to the optical alignment device above, where the substrate is placed on the support component of the optical alignment device, and there are at least two different models of products designed to be arranged on the substrate with their alignment directions different from each other; and the method includes following operations.

Operation 101: driving light shielding plates of several light shielding mechanisms to slide to above products with other models than products with a model to be aligned on the substrate.

Operation 102: aligning the products with the model to be aligned on the substrate.

Operation 103: driving the rotation shaft to rotate by a selected angle, so as to align products with another model to be aligned on the substrate.

With the optical alignment method for a substrate according to the embodiment above of the present disclosure, the products on the substrate can be aligned in different directions to thereby improve the utilization ratio of the base substrate, and lower the production cost.

Evidently those skilled in the art can make various modifications and variations to the present disclosure without departing from the spirit and scope of the present disclosure. Accordingly the present disclosure is also intended to encompass these modifications and variations thereto so long as the modifications and variations come into the scope of the claims appended to the present disclosure and their equivalents.

The invention claimed is:

1. A table for an optical alignment device, comprising:
a base comprising a rotation shaft;
a support component connected with the rotation shaft;
an installation component connected with the rotation shaft;
a plurality of sliding guiding mechanisms connected with the installation component; and
a plurality of groups of light shielding mechanisms; wherein each sliding guiding mechanism is slidably installed with a group of light shielding mechanisms, each light shielding mechanism in each group of light shielding mechanisms comprises a light shielding plate which can slide to above a selected area of the support component;
wherein there are different distances between light shielding plates of light shielding mechanisms slidably installed on different sliding guiding mechanisms and the support component.

2. The table for an optical alignment device according to claim 1, wherein guiding directions of the sliding guiding mechanisms are same.

3. The table for an optical alignment device according to claim 1, wherein there are at least two light shielding mechanisms comprised in the group of light shielding mechanisms slidably installed on each sliding guiding mechanism.

4. The table for an optical alignment device according to claim 1, wherein:
each sliding guiding mechanism comprises two guiding rails arranged opposite to each other on two sides of the support component; and
each light shielding mechanism comprises two connection pieces connected with the light shielding plate of the light shielding mechanism, and slidably installed respectively over two guiding rails of a sliding guiding mechanism slidably installed with the light shielding mechanism.

5. The table for an optical alignment device according to claim 4, wherein there are different distances between different sliding guiding mechanisms and the support component.

6. The table for an optical alignment device according to claim 1, wherein there are a plurality of support nails arranged uniformly on an upper surface of the support component, wherein the upper surface of the support component is a surface facing away from a surface of the support component facing the base.

7. An optical alignment device, comprising a table for an optical alignment device, wherein the table comprising:
a base comprising a rotation shaft;
a support component connected with the rotation shaft;
an installation component connected with the rotation shaft;
a plurality of sliding guiding mechanisms connected with the installation component; and
a plurality of groups of light shielding mechanisms; wherein each sliding guiding mechanism is slidably installed with a group of light shielding mechanisms, each light shielding mechanism in each group of light shielding mechanisms comprises a light shielding plate which can slide to above a selected area of the support component;
wherein there are different distances between light shielding plates of light shielding mechanisms slidably installed on different sliding guiding mechanisms and the support component.

8. The optical alignment device according to claim 7, wherein guiding directions of the sliding guiding mechanisms are same.

9. The optical alignment device according to claim 7, wherein there are at least two light shielding mechanisms comprised in the group of light shielding mechanisms slidably installed on each sliding guiding mechanism.

10. The optical alignment device according to claim 7, wherein:
each sliding guiding mechanism comprises two guiding rails arranged opposite to each other on two sides of the support component; and
each light shielding mechanism comprises two connection pieces connected with the light shielding plate of the light shielding mechanism, and slidably installed respectively over two guiding rails of a sliding guiding mechanism slidably installed with the light shielding mechanism.

11. The optical alignment device according to claim 7, wherein there are different distances between different sliding guiding mechanisms and the support component.

12. The optical alignment device according to claim 7, wherein there are a plurality of support nails arranged uniformly on an upper surface of the support component, wherein the upper surface of the support component is a surface facing away from a surface of the support component facing the base.

13. An optical alignment method for a substrate, applicable to the optical alignment device according to claim 7, wherein the substrate is placed on the support component of the optical alignment device, and there are at least two different models of products designed to be arranged on the substrate with their alignment directions different from each other; and the method comprises:
driving light shielding plates of several light shielding mechanisms to slide to above products with other models than products with a model to be aligned on the substrate;
aligning the products with the model to be aligned on the substrate; and
driving the rotation shaft to rotate by a selected angle, so as to align products with another model to be aligned on the substrate.

* * * * *